United States Patent
Kubasik et al.

(10) Patent No.: US 9,686,386 B1
(45) Date of Patent: Jun. 20, 2017

(54) MOBILE APPLICATION FOR TRAVEL-RELATED INFORMATION

(71) Applicant: Travel and Transport, Inc., Omaha, NE (US)

(72) Inventors: Michael P. Kubasik, Elkhorn, NE (US); Tim A. Krueger, Bellevue, NE (US); James J. Svoboda, Omaha, NE (US); Timothy G. Arnold, Plattsmouth, NE (US)

(73) Assignee: TRAVEL AND TRANSPORT, INC., Omaha, NE (US)

( * ) Notice: Subject to any disclaimer, the term of this patent is extended or adjusted under 35 U.S.C. 154(b) by 0 days.

(21) Appl. No.: 13/769,781

(22) Filed: Feb. 18, 2013

Related U.S. Application Data

(60) Provisional application No. 61/600,138, filed on Feb. 17, 2012.

(51) Int. Cl.
*H04L 29/06* (2006.01)
*H04M 1/02* (2006.01)

(52) U.S. Cl.
CPC .................................. *H04M 1/0266* (2013.01)

(58) Field of Classification Search
None
See application file for complete search history.

(56) References Cited

U.S. PATENT DOCUMENTS

| | | | |
|---|---|---|---|
| 7,970,666 B1 | 6/2011 | Handel | |
| 2005/0124322 A1* | 6/2005 | Hennecke | 455/412.1 |
| 2008/0171559 A1 | 7/2008 | Frank et al. | |
| 2008/0177584 A1 | 7/2008 | Altaf et al. | |
| 2008/0294469 A1 | 11/2008 | Caballero et al. | |
| 2009/0006143 A1 | 1/2009 | Orttung et al. | |
| 2009/0210262 A1 | 8/2009 | Rines et al. | |
| 2010/0190468 A1* | 7/2010 | Scott et al. | 455/404.2 |
| 2010/0228577 A1 | 9/2010 | Cunningham et al. | |
| 2010/0332326 A1* | 12/2010 | Ishai | G06Q 10/10 705/14.58 |
| 2011/0225257 A1* | 9/2011 | Tilden et al. | 709/207 |
| 2011/0288768 A1* | 11/2011 | Stefani | G06Q 30/0281 701/533 |
| 2013/0166329 A1* | 6/2013 | Arnoux-Prost | G06Q 10/02 705/5 |

\* cited by examiner

*Primary Examiner* — Suhail Khan
(74) *Attorney, Agent, or Firm* — Milligan PC LLO

(57) ABSTRACT

A mobile electronic device that is configured to display travel-related information is disclosed. In one or more implementations, the electronic device includes a touch-sensitive display, the touch-sensitive display configured to receive one or more inputs, a memory operable to store one or more modules, and a processor communicatively coupled to the touch-sensitive display and to the memory. The processor is operable to execute the one or more modules to cause display of one or more graphical representations of travel-related data at the touch-sensitive display. The processor is also operable to cause display of a telephonic communication graphical interface and to cause a telephonic communication link to be established with a travel representative of a travel management company in response to an input received over the telephonic communication graphical interface.

12 Claims, 9 Drawing Sheets

MOBILE APPLICATION FOR TRAVEL-RELATED INFORMATION

CROSS-REFERENCE TO RELATED APPLICATIONS

The present application claims the benefit under 35 U.S.C. §119(e) of U.S. Provisional Application Ser. No. 61/600,138, entitled MOBILE-APPLICATION FOR TRAVEL-RELATED INFORMATION, filed on Feb. 17, 2013. U.S. Provisional Application Ser. No. 61/600,138 is herein incorporated by reference in its entirety.

BACKGROUND

Application software ("an app") is computer software designed to assist a user in performing one or more specific tasks. For example, some apps are specifically designed as mobile apps that are configured to execute on mobile electronic devices, such as smartphones, tablet computers, and so forth. In implementations, application software includes, but is not limited to: enterprise software, graphics software, media players, or the like.

SUMMARY

A mobile electronic device that is configured to display travel-related information is disclosed. In one or more implementations, the electronic device includes a touch-sensitive display, the touch-sensitive display configured to receive one or more inputs, a memory operable to store one or more modules, and a processor communicatively coupled to the touch-sensitive display and to the memory. The processor is operable to execute the one or more modules to cause display of one or more graphical representations of travel-related data at the touch-sensitive display. The processor is also operable to cause display of a telephonic communication graphical interface and to cause a telephonic communication link to be established with a travel representative of a travel management company in response to an input received over the telephonic communication graphical interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Example Implementations

Figure 1:
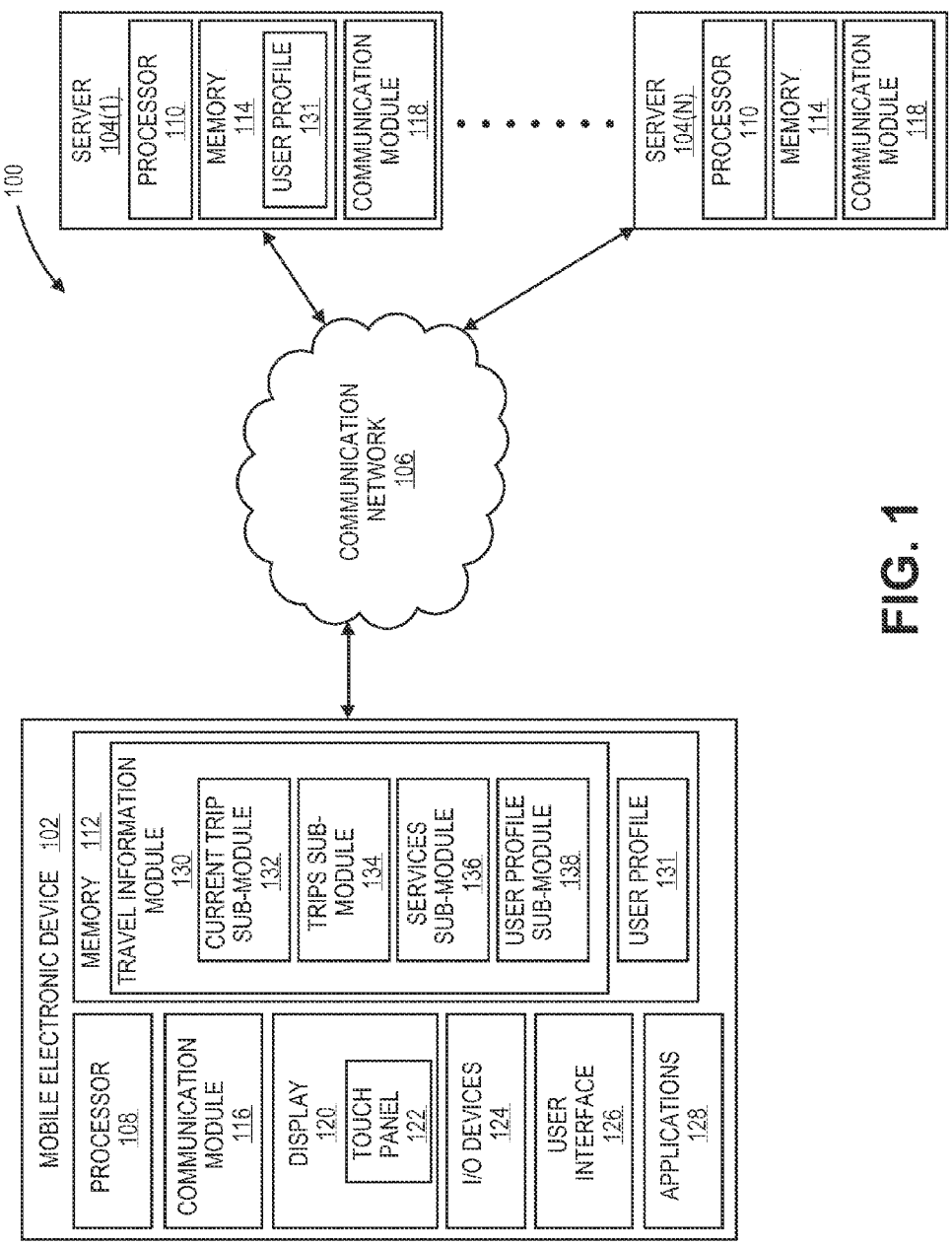
FIG. 1 is an example environment in which techniques may be implemented to configure a mobile electronic device to furnish travel-related information pertinent to a user of the device.

FIG. 1 illustrates an example environment 100 in an example implementation that is operable to facilitate display of travel related information to a user. The environment 100 includes a mobile electronic device 102 configured to communicate with one or more servers 104 (shown as servers 104(1) to 104(N) in FIG. 1) over a communication network 106. The servers 104 are configured to furnish travel-related data and/or information pertinent to a user (e.g., flight-related data, web mapping services, weather-related data, ground transportation service data, etc.) to the mobile electronic device 102. For example, the servers 104 may furnish the device 102 with weather-related data pertaining to one or more travel locations of interest to the user. In another example, the servers 104 may furnish travel-related alerts concerning travel locations to the device 102. In yet another example, the servers 104 may furnish transportation-related data (e.g., ground transportation service locations at each travel destination, etc.) to the device 102. In yet another example, the servers 104 may be configured to automatically push travel-related data/information pertinent to the user to the device 102. For example, if a user modifies his/her travel arrangements (e.g., through a travel representative, online, etc.), the server 104 is configured to automatically furnish the modified travel arrangements to the device 102. In an implementation, the servers 104 may be servers (e.g., a dedicated server as described in greater detail herein) associated with a travel management company, a server configured to provide flight status and airport information (e.g., a server associated with FlightStats), a server configured to provide travel alerts (e.g., a server associated with the State Department), or the like.

In FIG. 1, the mobile electronic device 102 and the servers 104 are illustrated as including a respective processor 108 or 110; a respective memory 112 or 114; and a respective communication module 116 or 118. In the following discussion, elements of the mobile electronic device 102 are described with reference to FIG. 1. Respective elements and/or reference numbers related to the servers 104 are shown in parentheses. Where appropriate, elements of the servers 104 are described separately.

The processor 108 (110) provides processing functionality for the mobile electronic device 102 and may include any number of processors, micro-controllers, or other processing systems and resident or external memory for storing data and other information accessed or generated by the device 102 (and the servers 104). The processor 108 (110) may execute one or more software programs (e.g., modules) that implement techniques described herein.

The memory 112 (114) is an example of tangible computer-readable media that provides storage functionality to store various data associated with the operation of the mobile electronic device 102 (the servers 104), such as the software program and code segments mentioned above, or other data to instruct the processor 108 (110) and other components of the mobile electronic device 102 to perform the steps described herein. Although a single memory 112 (114) is shown, a wide variety of types and combinations of memory may be employed. The memory 112 (114) may be integral with the processor 108 (110), stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the device 102, the memory 112 (114) may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The mobile electronic device 102 is communicatively coupled to the servers 104 over a communication network 106 through the communication module 116 (and vice versa via communication module 118). The communication module 116 (118) may be representative of a variety of communication components and functionality, including, but not limited to: one or more antennas; a browser; a transmitter and/or receiver; a wireless radio; data ports; software interfaces and drivers; networking interfaces; data processing components; and so forth. For example, the communication module 116 (118) may represent radio frequency (RF) circuitry configured to receive and/or transmit electromagnetic signals. The RF circuitry is also configured to convert electrical signals to/from electromagnetic signals and communicates with the communications network 106 and other communications devices via the electromagnetic signals. RF circuitry may include, but is not limited to: an antenna system, an RF transceiver, one or more amplifiers, a tuner, one or more oscillators, a digital signal processor, a CODEC chipset, a subscriber identity module (SIM) card, memory, and so forth.

The communication module 116 (118) facilitates communication with other devices (e.g., electronic mobile devices, servers, desktop computers, laptop computers, etc.) through the communication network 106, external ports (e.g., Universal Serial Bus (USB), FIREWIRE, etc.) included in the mobile electronic device 102, or the like. The external ports is adapted for communicatively coupling the device 102 directly to other devices or indirectly over the communication network 106. In some embodiments, the external port is a multi-pin connector, or the like.

The communication network 106 may comprise a variety of different types of networks and connections that are contemplated, including, but not limited to: the Internet; an intranet; a satellite network; a cellular network; a mobile data network; wired and/or wireless connections; and so forth.

Wireless networks may comprise any of a plurality of communications standards, protocols and technologies, including but not limited to: Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), WiMAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS), and/or Short Message Service (SMS), or any other suitable communication protocol.

The mobile electronic device 102 includes a display 120 to display information to a user of the mobile electronic device 102. In embodiments, the display 120 may comprise an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. The display 120 may be backlit via a backlight such that it may be viewed in the dark or other low-light environments. In some implementations, the display 120 may not be integrated into the mobile electronic device 102 and may instead be connected externally using universal serial bus (USB), Ethernet, serial connections, and so forth.

The display 120 may be provided with a touch panel 122 for entry of data and commands. For example, a user may operate the mobile electronic device 102 by touching the touch panel 122 and/or by performing gestures on the screen 122. In some embodiments, the touch panel 122 may be a capacitive touch screen, a resistive touch screen, an infrared touch screen, combinations thereof, and the like. The mobile electronic device 102 may further include one or more input/output (I/O) devices 124 (e.g., a keypad, buttons, a wireless input device, a thumbwheel input device, a trackstick input device, and so on). The I/O devices 124 may include one or more audio I/O devices, such as a microphone, speakers, and so on.

The mobile electronic device 102 is illustrated as including a user interface 126, which is storable in memory 112 and executable by the processor 108. The user interface 126 is representative of functionality to control the display of information and data to the user of the mobile electronic device 102 via the display 120. In some implementations, the display 120 may not be integrated into the mobile electronic device and may instead be connected externally using universal serial bus (USB), Ethernet, serial connections, and so forth. The user interface 126 may provide functionality to allow the user to interact with one or more applications 128 of the mobile electronic device 102 by providing inputs via the touch panel 122 and/or the I/O devices 124. For example, the user interface 126 may cause an application programming interface (API) to be generated to expose functionality to an application 128 to configure the application for display by the display 120 or in combination with another display. In embodiments, the API may further expose functionality to configure the application 128 to allow the user to interact with an application by providing inputs via the touch panel 122 and/or the I/O devices 124.

Applications 128 may comprise software (e.g., sub-routines) that is storable in memory 112 and executable by the processor 108, to perform a specific operation or group of operations to furnish functionality to the mobile electronic device 102. Example applications may include calendar applications, cellular telephone applications, instant messaging applications, email applications, photograph sharing applications, address book applications, and so forth.

As shown in FIG. 1, the mobile electronic device 102 includes a travel information module 130, which is storable in memory 112 and executable by the processor 108. For example, the travel information module 130 comprises a routine configured to perform the tasks described herein. The travel information module 130 is configured to cause the device 102 to transmit/receive travel-related data between the device 102 and the servers 104. In one or more implementations, the servers 104 comprise a dedicated server environment. For example, the dedicated server may comprise a server that is owned and/or operated by a single entity (e.g., a server owned and operated a travel management company). For instance, the servers 104 may be dedicated servers owned and/or operated by a travel management company, such as Travel and Transport, Inc. Thus, the servers 104 may furnish travel-related data to the mobile electronic device 102 that is furnished and controlled by the company. This may allow for the transmission of directed travel-related data (e.g., data that has been edited, uploaded, furnished, and/or modified by the travel management company) to an operator of the mobile electronic device 102 based upon a user profile 131 stored within the servers 104 (e.g., a proprietary user profile stored on the dedicated servers in the memory 114). Additionally, the user profile 131 can be stored in the mobile electronic device 102 in the memory 112. The user (e.g., operator of the mobile electronic device 102) profile 131 may included data provided by the user regarding one or more aspects of the user's travel criteria (e.g., when the user wishes to receive travel-related alerts, types of food the user likes to eat while traveling, etc.). In other examples, the user may tailor the user's profile 131 in order to receive desired travel-related data. The user profile 131 may also include unique identifiers that are utilized when the user initiates a telephonic communications link, as discussed in greater detail herein. Thus, in some implementations, the server 104 transmits proprietary travel-related data to the mobile electronic device 102. In other implementations, the dedicated server may transmit travel-related data from another server 104 not related to the travel management company (e.g., a server 104 owned and/or operated by the State Department, a server 104 owned and/or operated by FlightStats) to the mobile electronic device 102.

The module 130 is configured to utilize at least a portion of the received travel-related data for the tasks described herein. In an implementation, the module 130 is also configured to cause the processor 108 to initiate a display of travel-related information pertinent to the user at the display 120. For example, the module 130 may cause the processor 108 to initiate a display of an interactive graphical interface 200 (e.g., a dashboard) at the display 120 (see FIGS. 2A through 2G). Upon a user initiating the travel information module 130 (e.g., touching the touch panel 122 corresponding to a graphical representation of the travel information module 130), a login screen 203 is displayed. The user may input user credentials (e.g., last name, booking confirmation number, departure date, password etc.) via one or more input fields 205 to authenticate the user. The user may submit the credentials by selecting a sign on button 206 (e.g., touching the touch panel 122 corresponding to the graphical representation of the "Sign On" button 206).

Once the user has submitted proper credentials to the device 102, the travel information module 130 is configured to cause the processor 108 to initiate display of the interactive graphical interface 200. As shown in FIGS. 2B through 2G, the interactive graphical interface 200 includes one or more tabs 203, 205, 207, 209 relating to travel-related information pertinent to the user. For example, the interactive graphical interface 200 may include a tab 203 relating to information corresponding to a current trip of the user; a tab 205 relating to information of one or more trips (e.g., a previous trip, a current trip, an upcoming trip, etc.); a tab 207 relating to service information (e.g., ground transportation services, hotel information, restaurants, etc.); and a tab 209 relating to a user profile 131 (e.g., profile containing information relating to the user, etc.). The module 130 may allow the user to update/edit the user profile (e.g., update an address, upload a photo of the user, etc.). In an implementation, the user profile may include a unique identifier assigned to the user (e.g., every user is assigned a unique identifier). The tabs 203, 205, 207, 209 represent an interface for allowing a user to navigate between one or more sub-modules (e.g., sub-routines) 132, 134, 136, 138 that correspond to the travel-related information. Thus, tab 203 represents a user interface to the current trip sub-module 132; tab 205 represents a user interface to the trips sub-module 134; tab 207 represents a user interface to the services sub-module 136; and tab 209 represents a user interface to the user profile sub-module 138. The user profile sub-module 138 functions as an interface to the provide access to the user profile 131 stored within the memory 112.

As shown in FIG. 1, the travel information module 130 includes the sub-modules 132, 134, 136, 138. The current trip sub-module 132 represents functionality to furnish current trip travel-related information to a user. In an implementation, the current trip sub-module 132 is configured to cause the device 102 to request current trip travel-related information pertinent to the user from the servers 104 and cause the processor 108 to initiate a graphical representation of the current trip travel-related information received from the servers 104. For example, the user may be traveling via air travel and may wish to review information related to the user's current trip. Once the travel information is received from the servers 104, the current trip sub-module 132 is configured to cause the processor 108 to initiate a display (through the display 120) of the current trip travel-related information to the user. For instance, the current trip sub-module 132 may cause the processor 108 to display an interactive travel itinerary related to the current user's current trip (e.g., upcoming flight schedule, upcoming flight departure and/or destination location, etc.). The user may select (e.g., touch the touch panel 122 corresponding to) the interactive travel itinerary to execute a sub-routine to receive additional information regarding the current trip information (e.g., location of the airport, departure/arrival time, etc.).

Figure 2A:
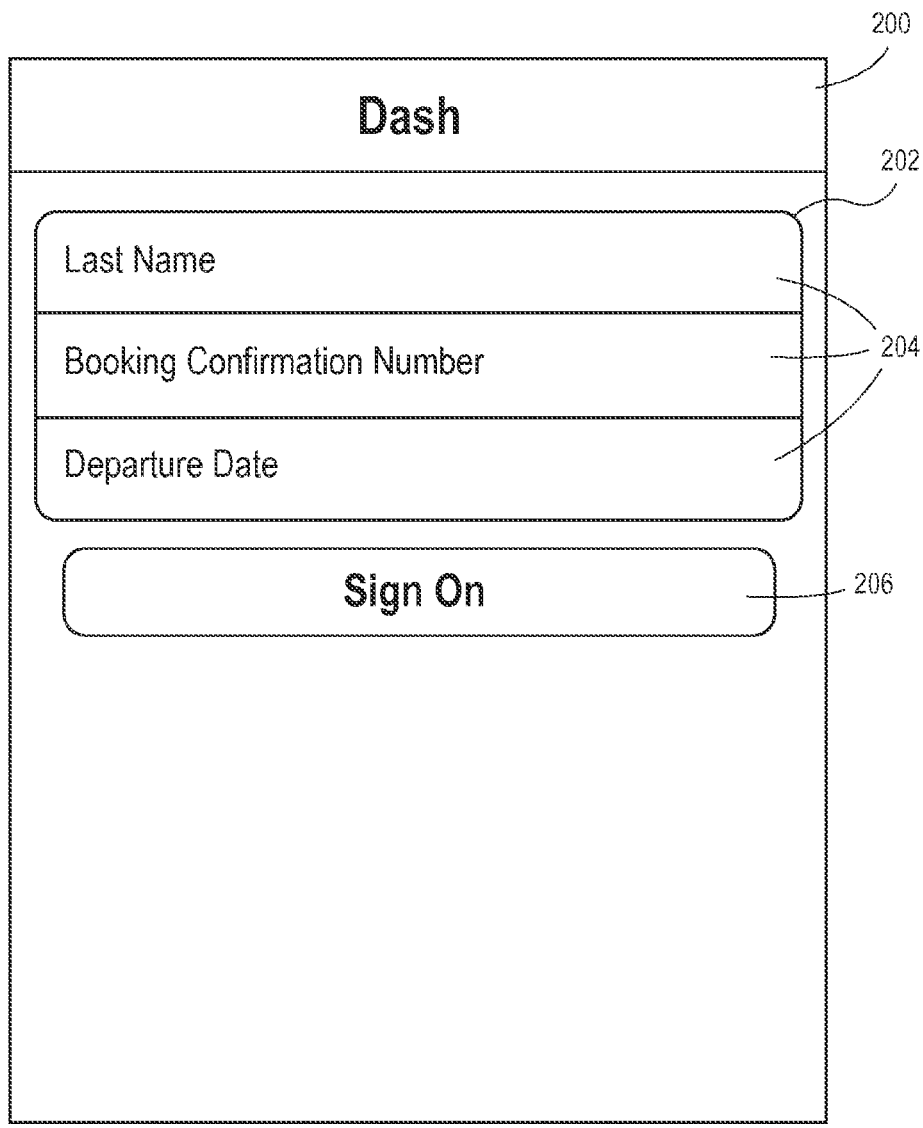
FIGS. 2A through 2G are diagrammatic depictions illustrating example displays for the mobile electronic device illustrated in FIG. 1.
Figure 2B:
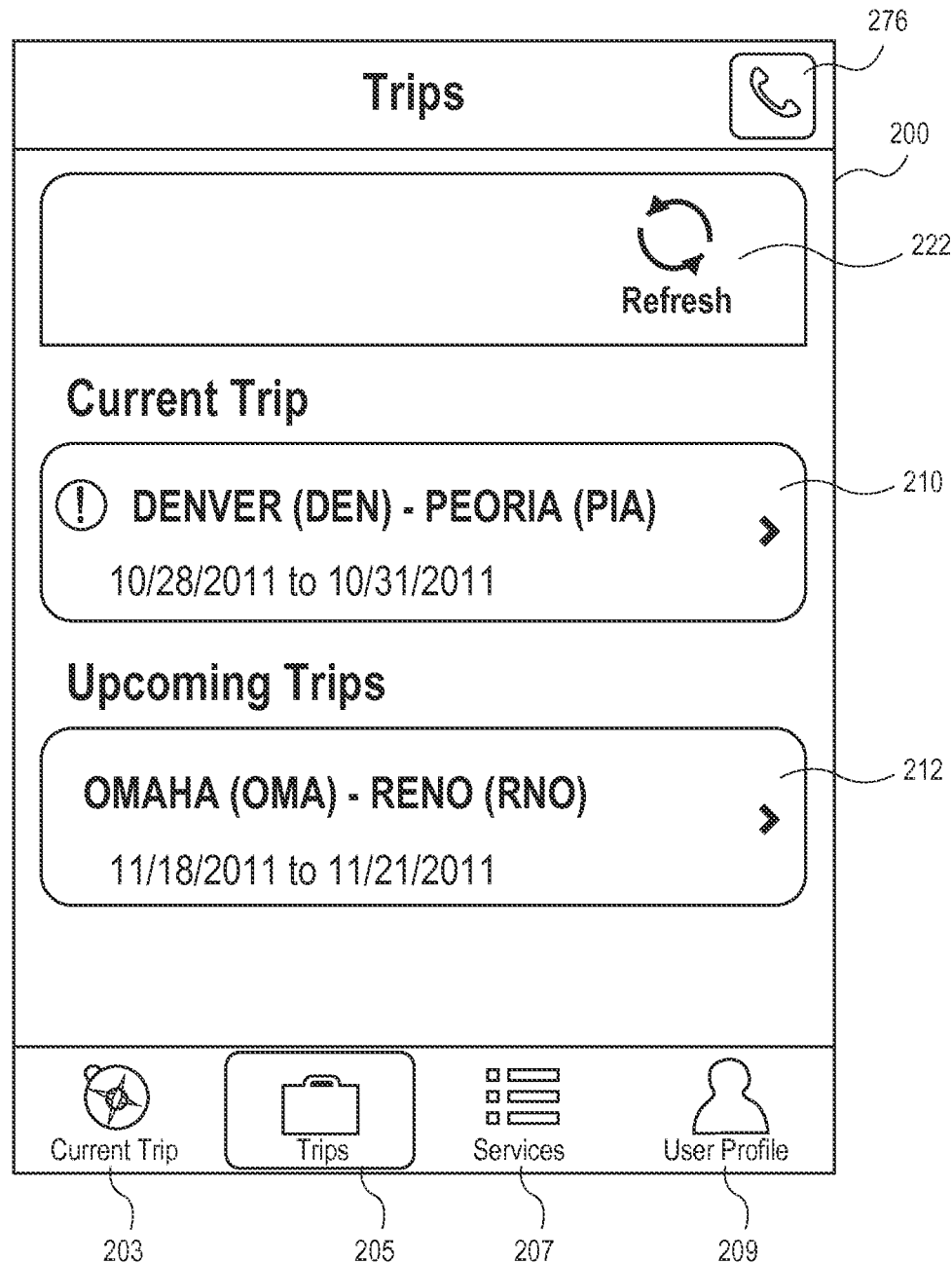
Figure 2C:
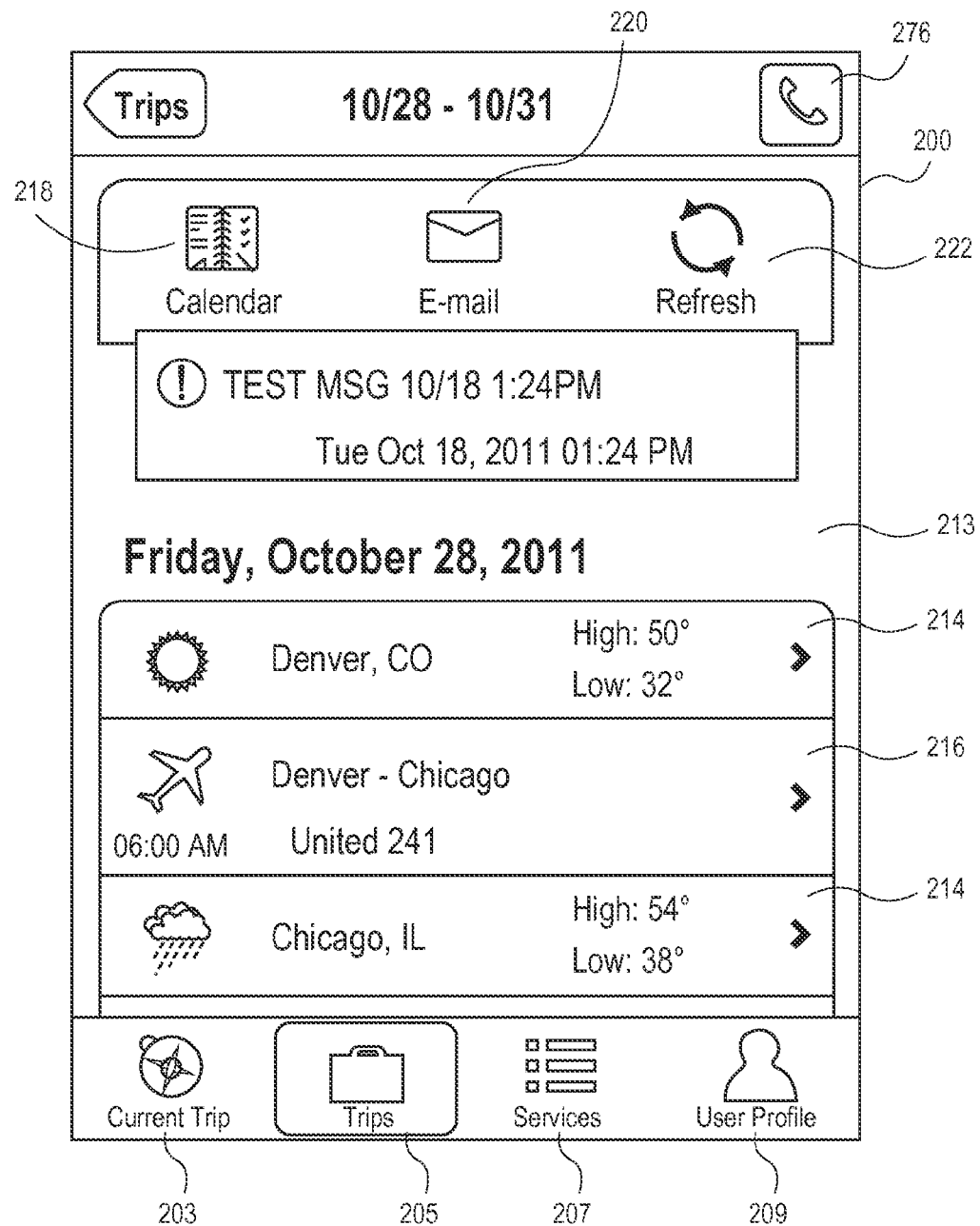

The trip sub-module 134 represents functionality to furnish trip travel-related information to a user. In an implementation, the trip travel-related information may include past, present, and future itineraries pertinent to the user. For example, the user may select the tab 205 to initiate execution of the trip sub-module 134. In response, the trip sub-module 134 causes the processor 108 to initiate graphical representations of trip travel-related information (e.g., past, present, and future itineraries) via the display 120. In an implementation, the itineraries are received from the servers 104 in response to a request from the device 102 (e.g., request initiated by the sub-module 134). In another implementation, the itineraries are stored in memory 112. As shown in FIG. 2B, a current trip interactive itinerary 210 and an upcoming trip interactive itinerary 212 are displayed. The current trip interactive itinerary 210 includes itinerary information pertaining to the user's current trip (e.g., departure location, destination location, dates of the trip, etc.). As described above, a user may select the interactive itinerary 210 to receive additional information related to the user's current trip. In response to a selection of the interactive itinerary 210, as shown in FIG. 2C, the trip sub-module 134 causes the processor 108 to initiate display of information 213 related to the current trip via the display 120. In an implementation, the information 213 includes an interactive graphical representation of weather information 214 that represents predicted and/or observed weather conditions for each travel segment of the user's trip (e.g., weather conditions for each departure/destination location). In an implementation, the user may select the interactive graphical representation of weather information 214 that initiates one or more sub-routines that initiate communication with the servers to receive detailed weather data (e.g., hourly weather forecast, three (3) day weather forecast, ten (10) day weather forecast, current conditions, etc.) at the device 102. The sub-routines may in turn be configured to cause the processor 108 to initiate a graphical representation of the weather data at the display 120.

The information 213 also includes an interactive graphical representation of flight information 216, which is discussed below in further detail. As shown, the information 213 may further include interactive graphical representations (e.g., tabs) that provide functionality to interface with a calendar application (e.g., an application 128) via a calendar tab 218, an e-mail application (e.g., application 128) via an e-mail tab 220, and a refresh tab 222. When selected, the refresh tab 222 is configured to cause the device 102 to communicate with the servers 104 to request and to receive any updated information pertaining to the user. It also understood that the servers 104 may be configured to automatically push updated data/information to the device 102.

In an implementation, the trip sub-module 134 may be executed to cause the device 102 to request updated information (via the communication module 116) from the servers 104 that includes, but is not limited to: weather information (e.g., sub-module 134 interfaces with a weather API to receive weather related information), current flight information (e.g., flight status, etc.), and so forth. The sub-module 134 is then configured to cause the processor 108 to initiate display of the updated information (e.g., information 213) at the display 120. As described above, the servers 104 may be configured to automatically push updated travel-related data/information to the device 102. In an implementation, the sub-module 134 may be configured to cause the processor 108 to issue a notification (e.g., alert) to the user that the travel-related data/information has been updated. For instance, the sub-module 134 may cause the processor 108 to issue a graphical representation of the updated travel-related data at the display 120. In another implementation, if a portion (e.g., leg, segment, etc.) of the trip is modified (e.g., flight is delayed, flight is cancelled, connecting flight is delayed, flight is cancelled, etc.), the sub-module 134 may be configured to cause the processor 108 to provide one or more options (e.g., other air transport service options to the desired destination, etc.) to the user due to the travel modification. For example, if a connecting flight is cancelled, the device 102 (and the sub-module 134) may receive data representing other flight options to the desired destination from a server 104 (e.g., a travel management company server). In response, the sub-module 134 is configured to cause the processor 108 to present the flight options to the user (e.g., via the display 120, etc.).

Figure 2D:
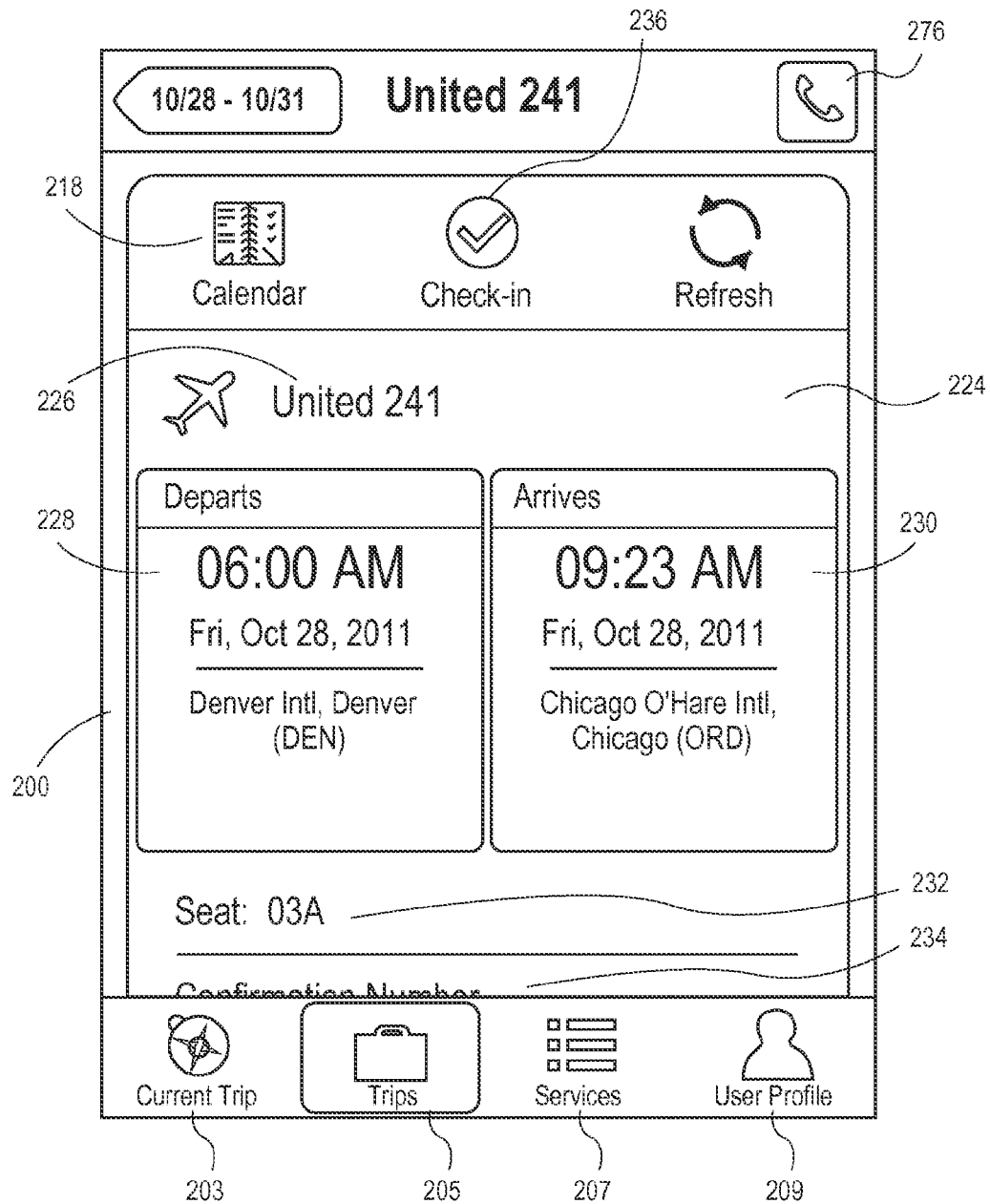

Once the user selects the interactive flight information 216, the trip sub-module 134 is configured to cause the processor 108 to display current flight information 224 pertaining to the user's current trip at the display 120 (see FIG. 2D). In an implementation, the current flight information 224 includes an expected flight number 226, departure information 228 (e.g., departure time, departure date, departure airport), arrival information 230 (e.g., arrival time, arrival date, arrival airport), a seat assignment 232, a flight confirmation number 234, or the like. Additionally, the current flight information 224 includes interactive graphical representations (e.g., tabs, user interfaces) that provide functionality to interface with the calendar application via a calendar tab 218, a check-in tab 236, and a refresh tab 222.

The check-in tab 236 is an interface for initiating a sub-routine to furnish flight check-in functionality to the user via the device 102 (e.g., the display 120). In an implementation, once a user selects the tab 236, the trip sub-module 134 is configured to communicate (e.g., via an application programming interface) with a server 104 that is configured to allow travelers to check-in for flights. The trip sub-module 134 is then configured to cause the processor 108 to initiate display check-in flight information and check-in flight input fields that can receive user check-in information. Once submitted by the user, the device 102 is configured to furnish the received user check-in flight information to the server 104 for airline check-in purposes.

Figure 2E:
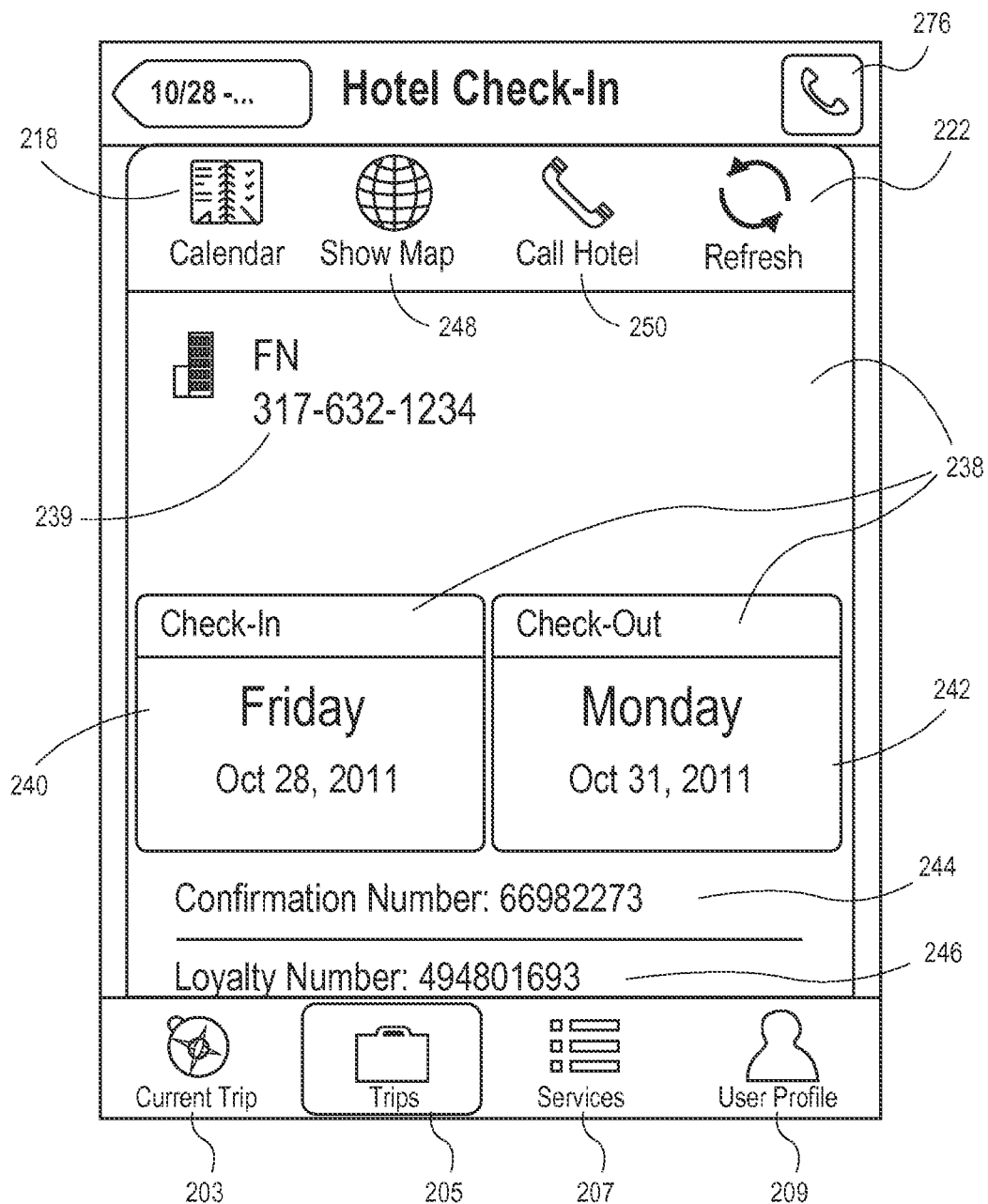

As shown in FIG. 2E, the trip sub-module 134 is also configured to cause the processor 108 to furnish lodging information 238 (e.g., information pertaining to the user's booked lodging/hotel arrangements) at the display 120. The trip sub-module 134 is configured to cause the device 102 to request data pertaining to the lodging information 238 from the servers 104 and receive data pertaining to the lodging information 238. Thus, the user can select a lodging check-in tab to cause the processor 108 to initiate display of lodging check-in information 238 at the display 120. The lodging check-in information 238 may include, but is not limited to: a phone number 239 associated with the lodging establishment (e.g., customer service number, etc.), check-in information 240 (e.g., check-in date, check-in time, etc.), check-out information 242 (e.g., check-out date, check-out time, etc.), a confirmation number 244, a lodging customer loyalty number 246, or the like. The lodging check-in information 238 also includes interactive graphical representations (e.g., tabs, user interfaces) that provide functionality to a user interface with the calendar application via a calendar tab 218, a mapping application via a show map tab 248, a call hotel tab 250, and a refresh tab 222.

The show map tab 248 is an interface for causing computer code to display an approximate location of the booked lodging structure (e.g., hotel, motel, etc.) via a web mapping service (e.g., GOOGLE maps, YAHOO maps, etc.). In an implementation, once a user selects the show map tab 248, the trip sub-module 134 may furnish lodging parameters (e.g., a street address of a hotel, latitude/longitude coordinates of a hotel, etc.) to the web mapping service via an application programming interface. In an implementation, the trip sub-module 134 may receive data corresponding to a mapped location (e.g., street map location, city map location, etc.) of the lodging structure from the web mapping service. The sub-module 134 is then configured to cause the processor 108 to display a graphical representation of a map (e.g., a street map signifying the location of the user's booked hotel, etc.) based upon the received data at the display 120. In another implementation, the trip sub-module 134 receives data corresponding to a route (e.g., directions) between a predetermined geographic location and the lodging structure. For example, a user may provide the predetermined geographic location through input fields. In another example, the geographic location of the device 102 may be provided to the web mapping service based upon suitable global positioning system (GPS) protocols. In this example, the sub-module 134 is then configured to cause the processor 108 to display a graphical representation of the map (e.g., map having a signified route from the predetermined geographic location to the hotel, directions from the predetermined geographic location to the hotel, etc.) based upon the received data at the display 120.

The call hotel tab 250 is an interface for causing the module 130 to cause the mobile electronic device 102 to initiate telephonic communication (e.g., communication via a cellular network, etc.) with the lodging establishment. For example, a user may select the call hotel tab 250 to initiate telephonic communication with a customer service representative of a hotel.

Figure 2F:
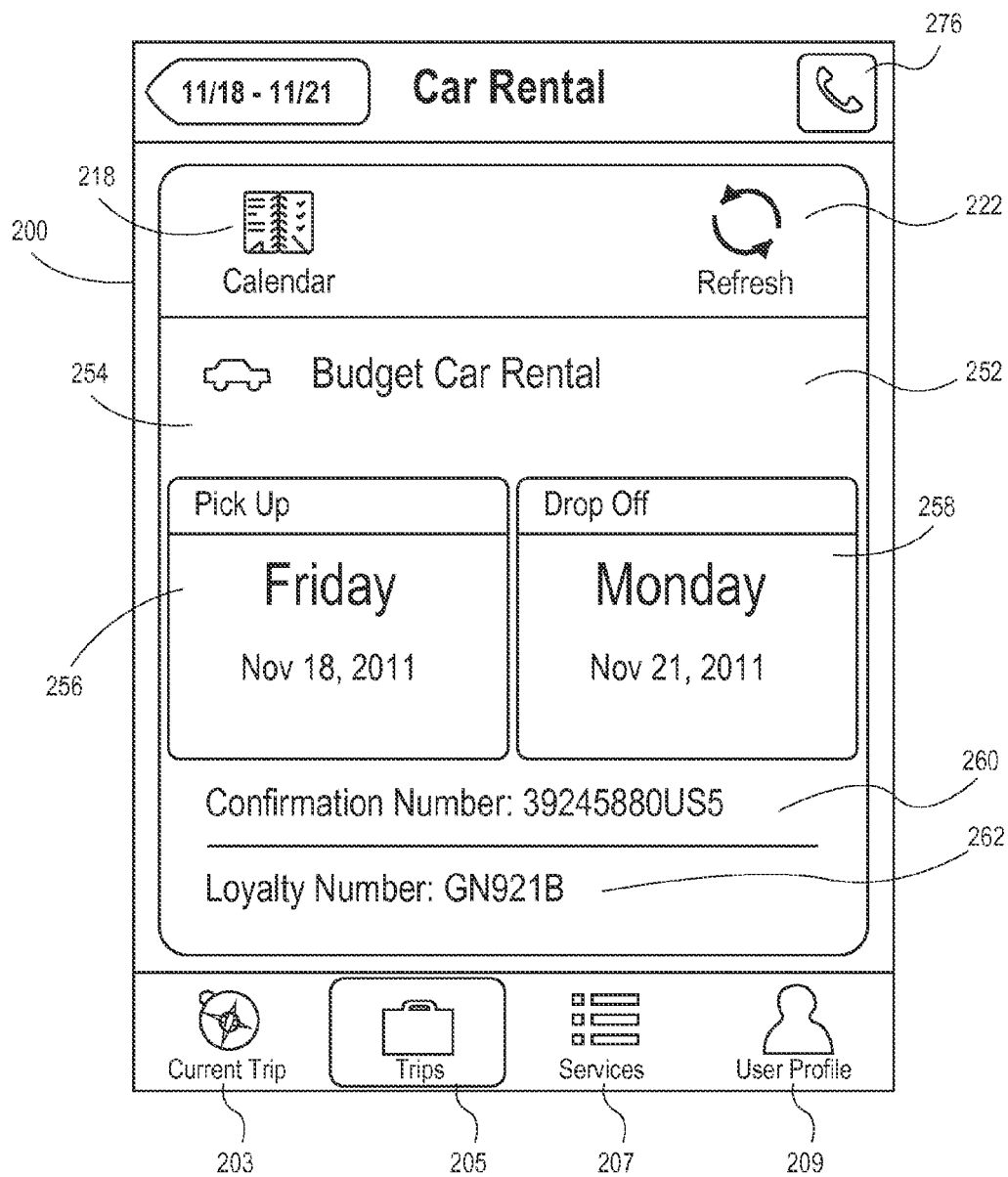

As shown in FIG. 2F, the trip sub-module 134 is also configured to cause the processor 108 to initiate a display of ground transportation information 252 at the display 120. In an implementation, the ground transportation information 252 may be selected (e.g., accessed) through one or more user interfaces as described above (e.g., interactive interfaces, tabs, etc.). The ground transportation information 252 may include, but is not limited to: company information 254 (e.g., car rental company name, car rental company location, car rental company contact information, etc.), a ground transportation pick-up information 256, a ground transportation drop off information 258, a confirmation number 260, a ground transportation loyalty number 262, or the like. The trip sub-module 134 may also cause the processor 108 to initiate display of graphical representations (e.g., tabs, user interfaces) that allow a user to interface with the calendar application via the calendar tab 218 and the refresh tab 222.

Figure 2G:

FIG. 2G illustrates interactive service interfaces 264 that perform various functionalities when selected by the user. The interactive service interfaces 264 may be accessed by selecting the tab 207, which executes the services sub-module 136 to cause the processor 108 to initiate display of the interactive service interfaces 264. As shown, the interactive service interfaces 264 include graphical representations of, but are not limited to: a currency converter sub-routine 266 (provides currency conversion functionality), a flight delays sub-routine 268 (provides flight delay retrieval functionality), a local info sub-routine 270 (provides local information [e.g., sites of interest to the locale, etc.] retrieval functionality), a maps sub-routine 272 (provides mapping retrieval functionality), a restaurants sub-routine 274 (provides food/drink establishment locator functionality (e.g., restaurant locator proximate to a geographical location), and so forth. In an implementation, a user may select an interactive service interface 264 to execute each respective sub-routine 266, 268, 270, 272, 274. For example, a user may touch the touch panel 122 proximate to (e.g., over) the graphical representation of the flight delays sub-routine 268 to execute the sub-routine 268. Once selected, the flight delays sub-routine 268 causes the device 102 to request flight delay data from the servers 104. The servers 104 may be configured to accommodate the request and provide flight delay data to the device 102 (and the flight delays sub-routine 268) for further processing. The flight delays sub-routine 268 is configured to cause the processor 108 to initiate display of a graphical representation of the flight delay data at the display 120. In an implementation, the sub-routine 268 may be configured to pass flight parameters associated with the user (e.g., user's flight number, user's flight destination, etc.) to the server 104 to receive flight delay data pertinent to the user. It is understood that a user may wish to customize the services offered through the flight information module 130 (e.g., customize the specific functionalities offered through the module 130). In an implementation, the flight information module 130 may provide a graphical interface in which the user may select which functionalities the user wishes to be displayed upon selection of the tab 207. For example, the user may wish to only be offered graphical representations of the flight delays sub-routine 268 and the local info sub-routine 270. It is also understood that the user may download additional applications ("apps") offered through a travel management company, software developer, or the like, to extend additional functionalities to the travel information module 130.

The travel information module 130 is configured to cause the processor 108 to initiate a display of a call center icon 276. The call center icon 276, once selected (e.g., touch panel 122 detects a touch over the displayed call center icon 276), is configured to cause the module 130 to initiate telephonic communication with a travel representative assigned to the user's organization. For instance, the module 130 may cause the mobile electronic device 102 to establish a telephonic communication link with a travel representative associated (e.g., employed or having an agency relationship) with the travel management company for which the user set-up the travel plans. The telephonic communication may be directed to a specific travel representative based at least partially on the unique identifier assigned to the user (e.g., unique identifier contained within the user profile 131).

The travel information module 130 is also configured to interface with a calendar application (e.g., a calendar application 128) accessible by the device 102. In an implementation, the device 102 may receive travel information pertinent to the user from the servers 104 and provide the travel information to the travel information module 130. The module 130 is configured to interface (via an application programming interface) with the calendar application and export the data representing the travel information to the calendar application. The calendar application is configured to cause the processor 108 to initiate a graphical representation of the user's calendar information (in calendar format) at the display 120 upon request. The module 130 may also be configured to automatically push updated flight information (e.g., flight delays, gate changes, etc.) to the calendar application when received so the calendar application may automatically reflect the updated information. For example, if a connecting flight is delayed/cancelled, another connecting flight option may be selected (e.g., through a travel representative, a selected option by the user through the device 102, etc.). The servers 104 then receive the updated connecting flight option and provide the updated flight option to the device 102, which is reflected in the user's calendar application.

The travel information module 130 is configured to furnish travel alerts relating to the user's travel plans. In an implementation, the travel information module 130 can cause the device 102 to request travel advisory/warning data from the servers 104 based upon the user's travel plans (e.g., the user's destination country (ies), etc.). Upon receiving a travel advisory/warning (e.g., State Department advisory, etc.), the module 130 is configured to cause the processor 108 to initiate a travel alert based upon the travel advisory/warning data. The travel alerts may be a graphical representation of the travel advisory/warning data, an audible travel alert, an alert included in the calendar information (e.g., alert included in the relevant travel segment of the calendar information), or the like.

The travel information module 130 is also configured to cause the device 102 to interface (via an application programming interface) with various web-based travel-related services. For example, upon a request, the travel information module 130 causes the device 102 to communicate with a website (e.g., http://www.seatguru.com) featuring aircraft seating maps, aircraft seating reviews, and so forth. Thus, the travel information module 130 can be configured to cause the processor 108 to initiate a graphical representation of an aircraft seating map at the display 120. In an implementation, the travel information module 130 may be configured to receive an aircraft seat request from the user and provide the request to the servers 104.

The travel information module 130 may include additional functionality as described herein. The travel information module 130 may include a sub-module configured to cause the processor 108 to communicate with the mapping application to cause the display 120 to display a mapping representation of the user's current trip in response to the user interacting (e.g., touching) an interactive graphical interface displaying the destination city. The travel information module 130 may also be configured to display baggage fees, airline upgrades, frequent flyer support (e.g., mile usage, status, etc.), a photo of the user associated with the user profile, an on-time percentage associated with the respective airline (e.g., airline for which the user is traveling with for the respective trip), the user's designated seating (e.g., the seating within a graphical representation of the aircraft, local information pertaining to the destination (e.g., frequented dinner locations per reviews through a website, city transportation recommendations [e.g., via a website, navigation technologies, etc.], an approximate time allotment for getting through airport security for each airport (e.g., via a website, via information provided through the servers 104, etc.), destination alerts (e.g., alerts provided through a private intelligence agency such as IJET, etc.), unused airline tickets on file, arrival/departure screen displays, display a graphical representation of a user's parking spot (e.g., API configured to interface with GPS technology, etc.), or the like. The module 130 may also be configured to display embedded city information associated with a ground segment. The travel information module 130 may also be configured to receive receipt information (e.g., captured through an image capture device integrated with the client device 102, etc.) and configured to upload the data representing the captured receipt image to an expense module configured to provide expense reporting to the company affiliated with the user. Additionally, the module 130 may function as an online booking tool that allows a user to book transportation services (e.g., airline, ground transportation, etc.).

The travel information module 130 may also be configured to locate other travelers related to the user proximate to a specified location (e.g., user's destination). For example, the module 130 may be configured to locate travelers associated with the user through a company affiliation, travelers associated with the user through a social network (FACEBOOK, TWITTER, LINKEDIN, GOOGLE+, etc.), or the like. In an implementation, the travel information module 130 may locate the travelers by interfacing with a social network, interfacing with other modules 130 installed on the traveler's client device 102, or the like.

In an implementation, the travel information module 130 is configured to cause the processor 108 to display a graphical representation of a help button through the display 120. When the help interfaced (e.g., touched) by a user, a sub-module is executed that causes the client device 102 to communicate with a travel management company (e.g., call a dedicated operator affiliated with the travel management company, initiate a SMS text message to a dedicated operator affiliated with the travel management company, etc.) to indicate to the travel management company that the user may be in trouble/distress.

In another implementation, the travel information module 130 is configured to interface with one or more other services. For example, the module 130 may interface with a voice-over-Internet protocol service (e.g., SKYPE, etc.) configured to allow the user to communicate with peers by voice, video, and instant messaging over the network 106. In another example, the module 130 may interface with global positioning system (GPS) navigation technologies to furnish GPS services to the user. In yet another example, the travel information module 130 may allow for portal integration, and so forth.

The travel information module 130 may also be configured to furnish a natural language user interface (e.g., an intelligent personal assistant) to the user in order to answer questions, make recommendations, and perform actions per the user's voice commands. The module 130 may also incorporate push technology configured to display travel information at the display 120 that is initiated by the server 104. Additionally, the module 130 may furnish customer surveys (e.g., cause processor to initiate display of customer service questions) pertaining to one or more aspects of the user's trip. For example, the module 130 may furnish a real-time survey relating to a user's experience with a customer service representative of the travel management company, or the like. The module 130 may also be configured to allow the user to initiate communication with a concierge service (e.g., a concierge service associated with the travel management company), or the like.

In some implementations, the travel information module 130 is configured to share trip information with other users. For example, a travel information module 130 associated with a first user of a first electronic device 102 may be configured to share travel information with a travel information module 130 associated with a second user of a second electronic device 102. The second user may interface with the second user's electronic device 102 to view travel information pertaining to the first user. In an implementation, the first user's travel information may be shared based upon a pre-defined criteria. For example, the travel information may be shared based upon a per-trip basis. In another example, the travel information may be shared based upon a pre-defined time period. It is contemplated that the module 130 may share the information by way of the respective user profile 131. Also, while FIG. 1 only illustrates one mobile electronic device 102, it is understood that multiple mobile electronic device's 102 may communication with the server(s) 104.

Example Methods

Figure 3:
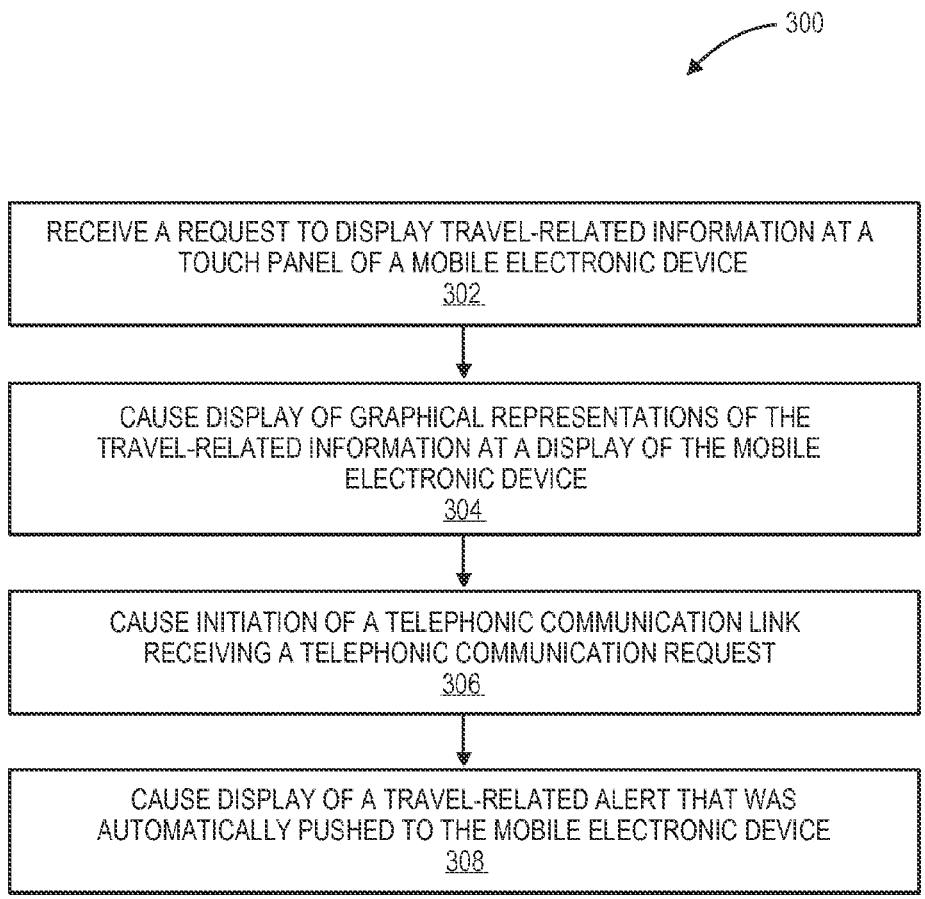
FIG. 3 is flow diagram illustrating an example method for displaying travel-related information in accordance with the present disclosure.

FIG. 3 illustrates an example method 300 for facilitating display of travel related information to a user. As shown, a request to display travel-related information is received at a touch panel (Block 302). As described above, a user of the mobile electronic device 102 may perform one or more gestures over the touch panel 122 to represent a request (e.g., a first request) for desired travel-related information. For example, the user may perform a gesture over the touch panel 122 to select a desired tab 203, 205, 207, 209 to cause the display of travel-related information corresponding to each respective tab, which was described in greater detail above.

Upon receiving the request, the processor is configured to cause display of graphical representations of the travel-related information (Block 304). In one or more implementations, the processor 108 is configured to cause display of graphical representations of the travel-related information at the display 120 in response to a user-provided gesture performed over the touch panel 122. For example, the processor 108 may cause the display of a current trip interactive itinerary 210 and an upcoming trip interactive itinerary 212. However, as described above, other graphical representations of travel-related information (e.g., flight-related data, web mapping services, weather-related data, ground transportation service data, etc.) can be displayed in accordance with the present disclosure.

As shown in FIG. 3, initiate a telephonic communication link upon receiving a telephonic communication request (Block 306). As described above, the user may be presented multiple graphical interfaces to allow the user to establish a telephonic communication link with. For example, the user may wish to speak with a customer service representative of a lodging establishment. In one or more implementations, the processor 108 is configured to cause the display of a call hotel tab 250 interface. The user of the mobile electronic device 102 may perform a gesture over the touch panel 122 to cause the processor 108 to initiate telephonic communication with the lodging establishment. For example, in response to a gesture performed over the tab 250, the module 130 causes the processor 108 to initiate telephonic communication with a pre-selected hotel (e.g., a hotel that the user is scheduled to stay for the user's current trip, a hotel that the user is schedule to stay for the user's upcoming trip, etc.). In some implementations, the module 130 may preselect the hotel to contact based upon the user profile 131. Additionally, the user may wish to speak with a travel agent (e.g., representative) of the travel management company. In this instance, the user may perform a gesture over the call center icon 276 (e.g., graphical interface). In response, the module 130 is configured to instruct the processor 108 to cause the establishment of a telephonic communications link between a travel representative of the travel management company and the mobile electronic device 102.

A travel-related alert that was automatically pushed to a mobile electronic device based upon a travel itinerary associated with the mobile electronic device may be displayed at a display (Block 308). In one or more implementations of the present disclosure, the module 130 is configured to cause the processor 108 to cause display of one or more travel-related alerts that were automatically pushed by a server 104 to a mobile electronic device 102 based upon a travel itinerary associated with the mobile electronic device 102. For example, the server 104 may push travel-related alerts (e.g., text messages, audible alerts, visual alerts, etc.) to the mobile electronic device 102 based upon the user profile 131 stored within the server 104. The user may have set preferences within the user profile 131 such that the server 104 is configured to push travel-related alerts (e.g., State Department alerts, weather related alerts, lodging related alerts, etc.) to the mobile electronic device 102.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims. A person skilled in the art will recognize that portions of the present disclosure may be implemented in hardware, software, firmware, combinations thereof, and so forth.

What is claimed is:

1. A mobile electronic device comprising:
   a touch-sensitive display, the touch-sensitive display configured to receive one or more inputs;
   a memory operable to store one or more modules;
   a communications module configured to communicatively couple to one or more servers, wherein the one or more servers are configured to furnish travel-related information to the mobile electronic device; and
   a processor communicatively coupled to the touch-sensitive display and to the memory, the processor operable to execute the one or more modules to:
   cause display of one or more graphical representations of the travel-related information at the touch-sensitive display;
   request and receive a first set of travel-related information based on a stored user profile, wherein the stored user profile comprises at least one travel itinerary, wherein the first set of travel-related information is provided based on a detected location of the device;
   receive a second set of travel-related information regarding one or more travel notices related to the stored user profile, wherein the second set of travel-related information comprises data regarding flight delays, flight cancellations, flight connections, airport information, and weather notifications;
   receive and display an estimated time for getting through airport security for a selected airport;
   receive and display a graphical representation of a user's parking spot;
   initiate a search based at least in part on the first set of travel-related information and the second set of travel-related information for alternative flight options for review and selection by the user, wherein the search is initiated upon receipt of a travel notice; and
   initiate a search of related travelers for review by the user, wherein the related travelers are identified based on determining a company affiliation, wherein the company affiliation is unrelated to any travel management company assisting the travelers or to any social network.

2. The mobile electronic device as recited in claim 1, wherein the one or more graphical representations of travel-related data includes a graphical representation conveying information for at least one of a current trip, an upcoming trip, services related to the current trip, or services related to the upcoming trip.

3. The mobile electronic device as recited in claim 2, wherein the graphical representation conveying information for the current trip includes a departure location, a destination location, and dates related to the current trip.

4. A non-transitory computer-readable medium embodying a program executable in at least one mobile computing device, the program comprising:
   code that causes display of one or more graphical representations of the travel-related information at the touch-sensitive display;
   code operable to cause display of one or more graphical representations of travel-related data at the touch-sensitive display;
   code operable to request and receive a first set of travel-related information based on a stored user profile, wherein the stored user profile comprises at least one travel itinerary, wherein the first set of travel-related information is provided based on a detected location of the device;
   code operable to receive a second set of travel-related information regarding one or more travel notices related to the stored user profile, wherein the second set of travel-related information comprises data regarding flight delays, flight cancellations, flight connections, airport information, and weather notifications;
   code operable to receive and display an estimated time for getting through airport security for a selected airport;
   code operable to receive and display a graphical representation of a user's parking spot;

code operable to initiate a search based at least in part on the first set of travel-related information and the second set of travel-related information for alternative flight options for review and selection by the user, wherein the search is initiated upon receipt of a travel notice; and code operable to initiate a search of related travelers for review by the user, wherein the related travelers are identified based on determining a company affiliation, wherein the company affiliation is unrelated to any travel management company assisting the travelers or to any social network.

5. The non-transitory computer-readable medium as recited in claim 4, wherein the one or more graphical representations of travel-related data includes a graphical representation conveying information for at least one of a current trip, an upcoming trip, services related to the current trip, or services related to the upcoming trip.

6. The non-transitory computer-readable medium as recited in claim 4, wherein the graphical representation conveying information for the current trip includes a departure location, a destination location, and dates related to the current trip.

7. The non-transitory computer-readable medium as recited in claim 4, further comprising code to cause a travel-related alert to be displayed at the touch-sensitive display.

8. The non-transitory computer-readable medium as recited in claim 7, wherein the travel-related alert is displayed in response to the travel-related alert being automatically pushed to the at least one mobile computing device.

9. A method comprising:
  causing display of one or more graphical representations of the travel-related information at the touch-sensitive display;
  requesting and receiving a first set of travel-related information based on a stored user profile, wherein the stored user profile comprises at least one travel itinerary, wherein the first set of travel-related information is provided based on a detected location of the device;
  receiving a second set of travel-related information regarding one or more travel notices related to the stored user profile, wherein the second set of travel-related information comprises data regarding flight delays, flight cancellations, flight connections, airport information, and weather notifications;
  receiving and displaying an estimated time for getting through airport security for a selected airport;
  receiving and displaying a graphical representation of a user's parking spot;
  initiating a search based at least in part on the first set of travel-related information and the second set of travel-related information for alternative flight options for review and selection by the user, wherein the search is initiated upon receipt of a travel notice; and
  initiating a search of related travelers for review by the user, wherein the related travelers are identified based on determining a company affiliation, wherein the company affiliation is unrelated to any travel management company assisting the travelers or to any social network.

10. The method as recited in claim 9, wherein the one or more graphical representations of travel-related data includes a graphical representation conveying information for at least one of a current trip, an upcoming trip, services related to the current trip, or services related to the upcoming trip.

11. The method as recited in claim 9, wherein the graphical representation conveying information for the current trip includes a departure location, a destination location, and dates related to the current trip.

12. The method as recited in claim 9, further comprising causing a travel related alert to be displayed at the touch-sensitive display.

* * * * *